(12) United States Patent
Tate

(10) Patent No.: US 12,334,797 B2
(45) Date of Patent: Jun. 17, 2025

(54) POWER SYSTEM

(71) Applicant: Hamilton Sundstrand Corporation, Charlotte, NC (US)

(72) Inventor: David James Tate, Hemel Hempstead (GB)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/391,986

(22) Filed: Dec. 21, 2023

(65) Prior Publication Data

US 2024/0275239 A1 Aug. 15, 2024

(30) Foreign Application Priority Data

Feb. 13, 2023 (EP) ..................................... 23156399

(51) Int. Cl.
| | |
|---|---|
| *H02K 7/108* | (2006.01) |
| *B64D 41/00* | (2006.01) |
| *F16D 11/00* | (2006.01) |
| *F16D 11/14* | (2006.01) |
| *H02K 7/18* | (2006.01) |

(52) U.S. Cl.
CPC .......... *H02K 7/1085* (2013.01); *B64D 41/00* (2013.01); *F16D 11/14* (2013.01); *H02K 7/1823* (2013.01); *F16D 2011/006* (2013.01)

(58) Field of Classification Search
CPC .... H02K 7/1085; H02K 7/1823; B64D 41/00; B64D 27/026; B64D 35/00; B64D 35/02; B64D 27/24; F16D 11/14; F16D 2011/006
See application file for complete search history.

(56) References Cited

U.S. PATENT DOCUMENTS

| | | | |
|---|---|---|---|
| 3,091,316 A | 5/1963 | Huffman | |
| 4,773,518 A | 9/1988 | Raad et al. | |
| 4,997,072 A | 3/1991 | Lapthorne | |
| 11,498,663 B2 | 11/2022 | Schmidt et al. | |
| 2021/0119511 A1 | 4/2021 | Bloor | |
| 2022/0025941 A1 | 1/2022 | Olson et al. | |
| 2022/0274715 A1 | 9/2022 | Beall et al. | |
| 2023/0052410 A1* | 2/2023 | Menheere | F02C 7/36 |
| 2023/0137247 A1* | 5/2023 | Kelly | H02K 7/108 |
| | | | 290/52 |

OTHER PUBLICATIONS

Extended European Search Report issued in corresponding European Patent Application No. 23156399.0 on Jul. 13, 2023. (7 pages).

* cited by examiner

*Primary Examiner* — Joseph Ortega

(57) ABSTRACT

A power system for an aircraft comprises: a motor-generator component; a shaft, wherein the motor-generator component is connectable to the shaft, the shaft connectable to an additional component of the aircraft to for torque transfer with the additional component; and a de-coupler operable to disconnect the motor-generator component from the shaft, wherein the motor-generator component is located between the de-coupler and the additional component in use.

20 Claims, 3 Drawing Sheets

POWER SYSTEM

CROSS-REFERENCE TO RELATED APPLICATIONS

This application claims priority to and the benefit of European Patent Application No. 23156399.0, filed Feb. 13, 2023, the entire content of which is incorporated herein by reference.

FIELD OF THE INVENTION

This application relates to power systems for aircraft.

BACKGROUND

Power systems for hybrid or electric propulsion aircraft may require complex architectures, for example, to connect a motor-generator component (e.g. a motor, a generator or a motor-generator) to an additional component (e.g. a turbine) for torque transfer. Due to power systems having significant maintenance requirements, it is desirable to improve the accessibility of the components of the system.

SUMMARY

In a first aspect, there is provided power system for an aircraft, the power system comprising: a motor-generator component; a shaft, wherein the motor-generator component is connectable to the shaft, the shaft connectable to an additional component of the aircraft to transmit an output torque and/or receive an input torque from the additional component; and a de-coupler operable to disconnect the motor-generator component from the shaft, wherein the motor-generator component is located between the de-coupler and the additional component in use.

The de-coupler improves the reliability of the power system, allowing the motor-generator component to be disconnected from the shaft in the event of a fault. Positioning the motor-generator component between the de-coupler and the additional component may reduce the system's space requirement and improve the accessibility of components of the system (e.g. the de-coupler) for maintenance.

The shaft may extend through the motor-generator component.

The motor-generator component may comprise a second shaft. The second shaft may be the motor-generator component's input and/or output shaft.

The shaft and the second shaft may nest with each other. One of the shaft and the second shaft may surround the other of the shaft and the second shaft.

The second shaft may surround the shaft.

The de-coupler may comprise a connector element. The connector element may be movable into a disconnected position to disconnect the motor-generator component from the shaft.

The connector element may be slidable into the disconnected position.

The connector element and the shaft may nest with each other. The connector element may surround the shaft.

The power system may comprise an actuator, the actuator configured to move the connector element into the disconnected position.

The actuator may be configured to maintain the connector element in the disconnected position in response to power being supplied to the actuator.

The actuator may be configured to move the connect element out of the disconnected position.

The actuator may be an electromagnetic actuator. The actuator may be a solenoid.

The connector element may comprise a first torque coupler for connecting to the second shaft.

The first torque coupler may comprise connector element teeth configured to engage with shaft teeth on the second shaft. The connector element teeth may extend in an axial direction (e.g. parallel to an axis of the shaft). The second shaft may comprise the shaft teeth configured to engage with the connector element teeth. The shaft teeth may extend in the axial direction. The shaft teeth may extend in an opposing direction to the connector element teeth.

The first torque coupler may be disconnected when the connector element is in the disconnected position.

The connector element teeth may be out of contact with the first shaft teeth when the connector element is in the disconnected position.

The connector element may comprise a second torque coupler for connecting to the shaft. The second torque coupler may comprise a sliding spline.

The power system may comprise a bias element. The bias element may be configured to bias the connector element away from the disconnected position. The bias element may be configured to bias the connector element towards the disconnected position. The bias element may be a spring.

The power system may comprise a latch, the latch configured to maintain the connector element in the disconnected position.

The latch may be a centrifugal latch, the centrifugal latch configured to open to release the connector element from the disconnected position when a rotational speed is below a threshold.

The motor-generator component may comprise a motor. The motor-generator component may comprise a generator. The motor-generator component may comprise a motor-generator.

The additional component may be a turbine.

The shaft may be an input shaft. The input shaft may be configured to receive torque from the additional component.

The shaft may be an output shaft. The output shaft may be configured to transmit torque to the additional component.

The shaft may be an input-output shaft. The input-output shaft may be configured to transmit torque to a turbine and receive torque from the additional component.

In a second aspect there is provided an aircraft comprising the power system as described above.

The aircraft may comprise the additional component connected to the shaft. The additional component may be a turbine.

The aircraft of the second aspect may comprise any of the features described above with respect to the first aspect.

BRIEF DESCRIPTION OF THE DRAWINGS

Various examples will now be described with reference to the accompanying drawings in which.

DETAILED DESCRIPTION

Figure 1:
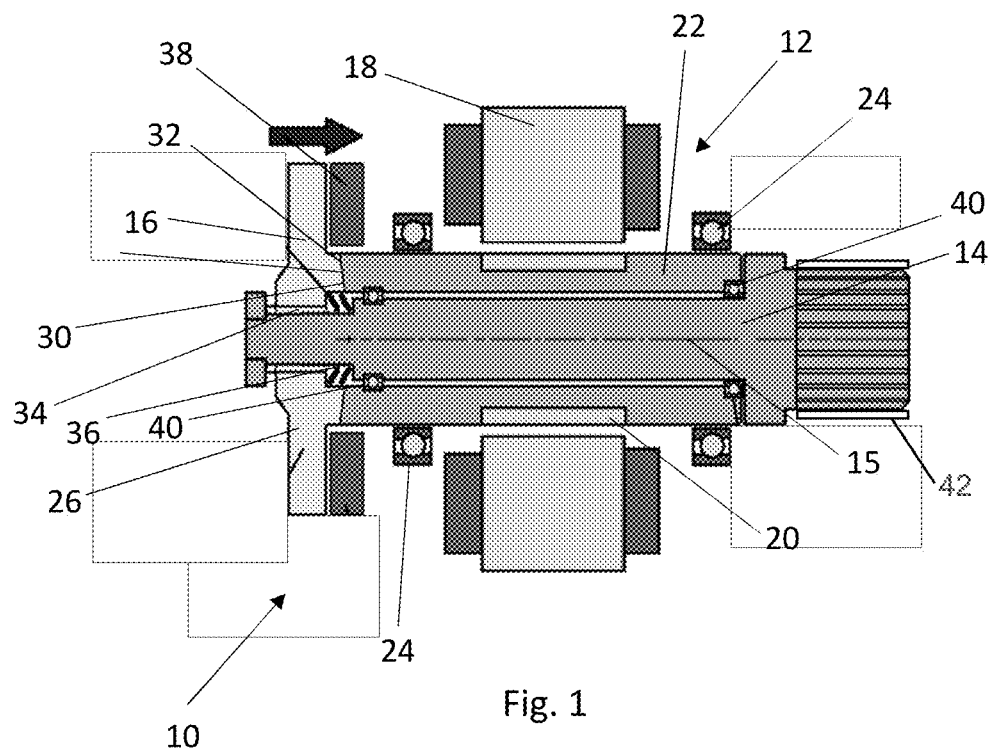
FIG. 1 shows a schematic cross-sectional drawing of a power system with a connector element in a connected position.
Figure 2:
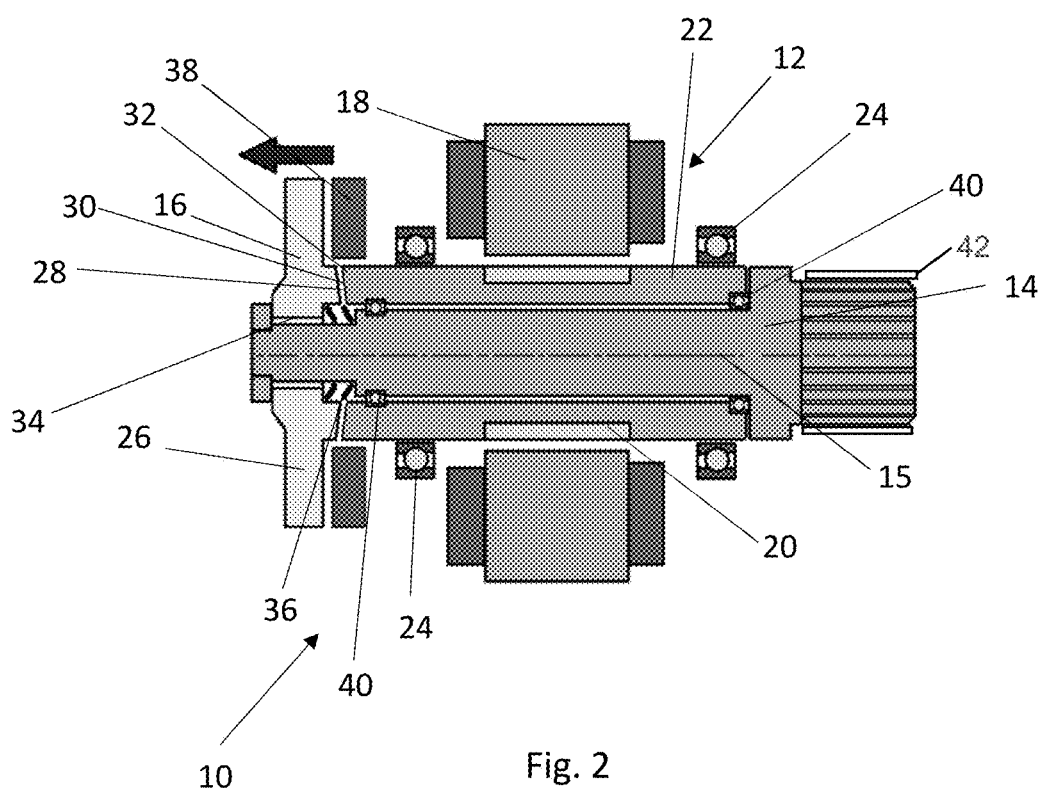
FIG. 2 shows a schematic cross-sectional drawing of the power system with a connector element in a disconnected position.

FIG. 1 and FIG. 2 show a power system 10 for an aircraft (not shown). The power system 10 comprises a motor-generator component 12, a shaft 14 and a de-coupler 16. The shaft 14 connects the motor-generator component 12 to an additional component 42, which in the present example is a turbine.

The motor-generator component 12 comprises a second shaft 22. In the present example the motor-generator component 12 is a motor-generator. The second shaft 22 is an input-output shaft 22 configured to transfer torque with the additional component 42, in the present example, by transmitting a torque to the additional component 42 and receiving a torque from the additional component 42.

In other examples the motor-generator component 12 is a motor and not a generator, and the second shaft 22 is an output shaft configured to transfer torque with the additional component 42 by transmitting a torque to the additional component 42. In other examples the motor-generator component 12 is a generator and not a motor, and the second shaft 22 is an input shaft configured to receive torque from the additional component 42.

The motor-generator component 12 comprises a stator 18 and a rotor 20. The stator 18 surrounds the rotor 20. The rotor 20 is fixed to the second shaft 22. The second shaft 22 is rotatably supported by a pair of second shaft bearings 24.

The de-coupler 16 comprises a connector element 26 for connecting the second shaft 22 to the shaft 14. The connector element 26 comprises a first torque coupler 28. The connector element 26 connects to the second shaft 22 via the first torque coupler 28.

The first torque coupler 28 comprises connector element teeth (not shown). The connector element teeth extend from an axial (defined with respect to an axis 15 of the shaft 14) face 30. The connector element teeth extend in an axial direction (e.g. parallel to the axis 15 of the shaft 14). The connector element teeth extend towards the second shaft 22.

The second shaft 22 comprises shaft teeth (not shown). The shaft teeth extend from an axial face 32 of the second shaft 22. The axial face 32 of the second shaft 22 faces the axial face 30 of the first torque coupler 28. The shaft teeth extend in an axial direction, opposing the connector element teeth. The connector element teeth are configured to engage with the shaft teeth to connect the connector element 26 to the second shaft 22 and transmit torque between the connector element 26 and the second shaft 22.

The connector element 26 comprises a second torque coupler 34. The second torque coupler 34 connects the connector element 26 to the shaft 14. The connector element 26 surrounds the shaft 14. The second torque coupler 34 faces the shaft 14. The second torque coupler 34 comprises a sliding spline (not shown). The sliding spline comprises grooves for engaging with corresponding grooves on the shaft 14. As such, the second torque coupler 34 remains connected to the shaft 14 as the connector element 26 slides relative to the common shaft 14.

The power system 10 comprises a bias element 36. The bias element 36 is configured to bias the connector element 26 to a disconnected position, as described in more detail below. The bias element 36 is a spring. The bias element 36 contacts the shaft 14 and the connector element 26. The axial position of the shaft 14 is fixed relative to the aircraft. The bias element 36 forces the connector element 26 away from the second shaft 22 by pushing against the shaft 14.

The power system 10 comprises an actuator 38. The actuator 38 is an electromagnetic actuator 38. The actuator 38 is a solenoid 38. As described below, the actuator 38 is configured to apply a force to the connector element 26 to move the connector element 26 to a connected position. In the present example the actuator 38 is energised to apply the force to the connector element 26.

The second shaft 22 and the shaft 14 nest with each other. The second shaft 22 surrounds the shaft 14. The second shaft 22, the shaft 14 and the stator 18 are coaxial. The shaft 14 is rotatably supported on the second shaft 22 by a pair of bearings 40.

The shaft 14 extends through the motor-generator component 12. The connector element 16 is positioned on an opposite side of the motor-generator component 12 to the additional component 42. The motor-generator component 12 is between the connector element 16 and the additional component 42. This may mean that the connector element 16 is inboard (with respect to an aircraft's wing) of the motor-generator component 12.

FIG. 1 shows the power system 10 with the connector element 26 of the de-coupler 16 in the connected position. In the present example, the actuator 38 is energised to slide the connector element 26 into the connected position.

In the connected position the connector element 26 is connected, via the first torque coupler, to the second shaft 22. The connector element 26 remains connected, via the second torque coupler 34 to the shaft 14.

In use, when the motor-generator component 12 acts as a motor, the stator 18 provides a magnetic field that drives the rotor 20. Because the rotor 20 is fixed to the second shaft 22, the second shaft 22 rotates with the rotor. The rotation of the second shaft 22 causes the connector element 26 to rotate, in this example due to the engagement of the connector element teeth with the second shaft teeth. The rotation of the connector element 26 causes the shaft 14 to rotate (in this example due to the engagement of the sliding spline). The shaft 14 then provides an output torque to the additional component 42, which in this example is a turbine.

When the motor-generator component 12 acts as a generator, the additional component 42 applies a torque to the shaft 14 to cause the shaft 14 to rotate. The rotation of the shaft 14 causes the connector element 26 to rotate (in this example due to the engagement at the sliding spline). The rotation of the connector element 26 causes the second shaft 22 to rotate (in this example due to the engagement of the connector element teeth with the second shaft teeth). The rotor 20 in turn rotates, which induces a current in the stator 18. The current induced in the stator 18 may be used to charge a battery or other energy storage (not shown), which may be used to drive the motor-generator component 12 as a motor later.

FIG. 2 shows the power system 10 with the connector element 26 of the de-coupler 16 in the disconnected position, in which the de-coupler 16 disconnects the motor-generator component 12 from the shaft 14. The de-coupler 16 may be controlled to disconnect the motor-generator component 12 from the shaft 14 in response to a fault with the motor-generator component 12.

In order to disconnect the motor-generator component 12 from the shaft 14, in the present example, the actuator 38 is de-energised. This causes the actuator 38 to stop applying a force to the connector element 26. The bias element 36 then forces the connector element 26 out of contact with the second shaft 22. In the disconnected position, the connector element teeth are out of contact with the second shaft teeth. The de-coupler 16 thereby disconnects the motor-generator component from the shaft 14. The shaft 14 and the second shaft 22 can then rotate independently of each other, with no torque transferred between the motor-generator component 12 and the additional component 42.

Figure 3:
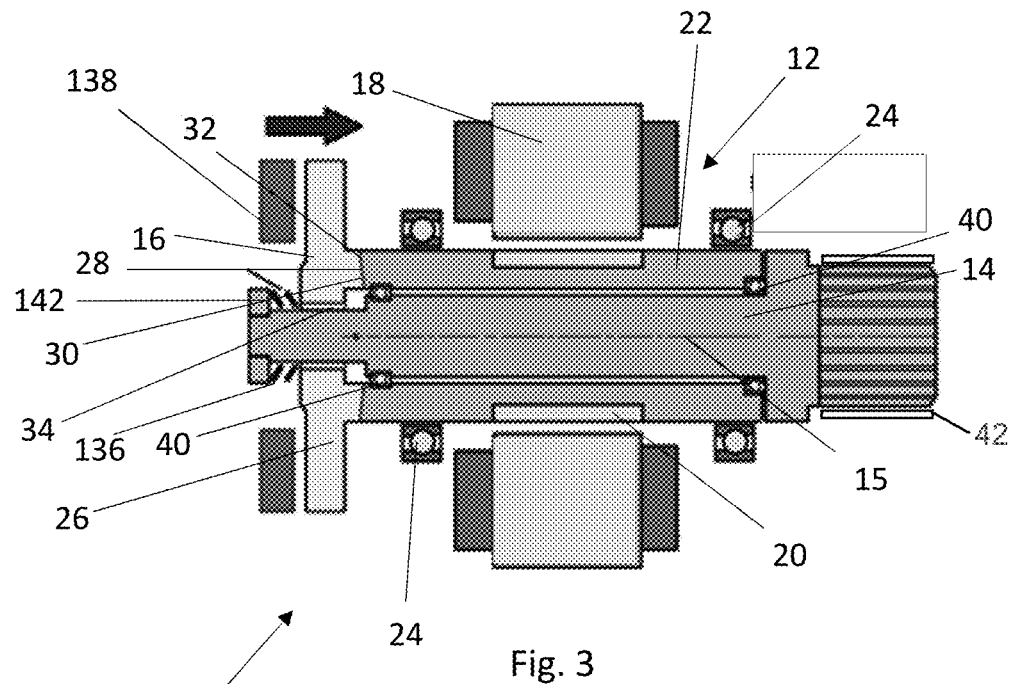
FIG. 3 shows a schematic cross-sectional drawing of a power system with a connector element in a connected position.
Figure 4:
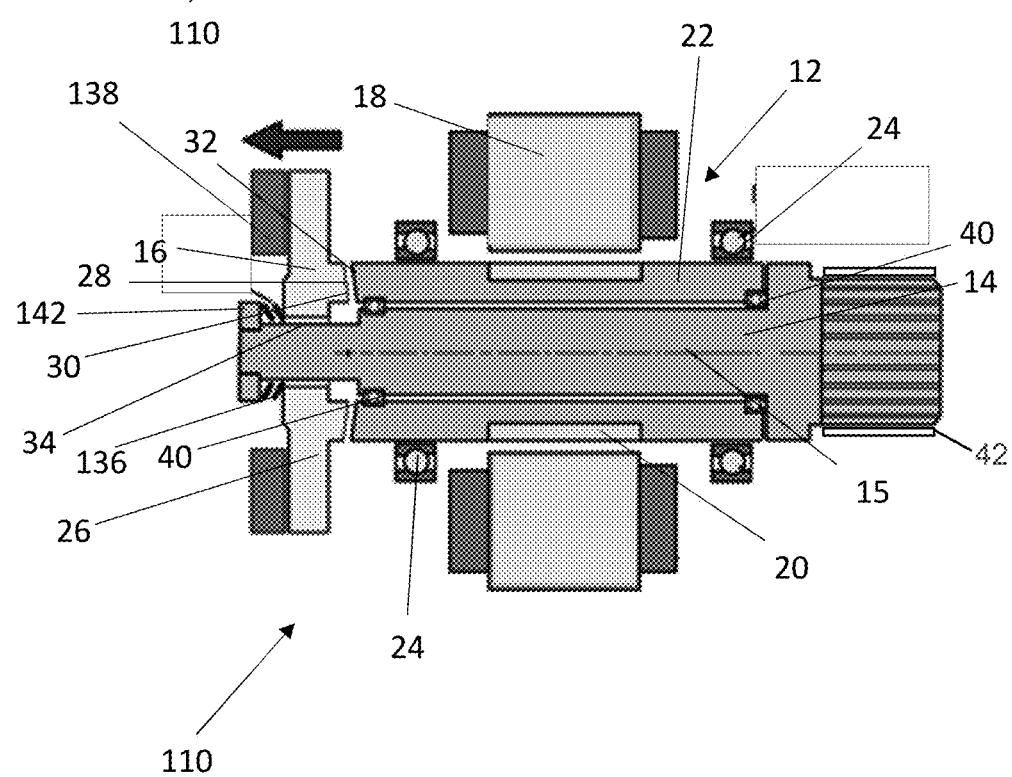
FIG. 4 shows a schematic cross-sectional drawing of a power system with the connector element in a disconnected position.

FIGS. 3 and 4 show a second power system 110. The second power system 110 comprises many of the features of the power system 10. Repeated description of those features is omitted, with the differences between the second power system 110 and the power system 10 described here. The same reference numerals are used for the same features in the power system 10 and the second power system 110.

In contrast to the power system 10, the second power system 110 comprises a second bias element 136 and a second actuator 138.

The second bias element 136 is configured to apply a force to the connector element 26 in an opposite direction to the bias element 36. The second bias element 136 is configured to bias the connector element 26 to the connected position. The second bias element 136 is a spring. The shaft 14 comprises an end stop 142. The end stop 142 is at an end of the shaft 14, opposite to the additional component 42. The second bias element 136 contacts the end stop 142 and the connector element 26. The axial position of the end stop 142 is fixed relative to the aircraft. The second bias element 136 forces the connector element 26 away from the end stop 142 towards the motor-generator component 12.

The second actuator 138 is configured to apply a force to the connector element 26 in an opposite direction to the actuator 38. The second actuator 138 is an electromagnetic actuator. The second actuator 138 is a solenoid. As described below, the second actuator 138 is configured to apply a force to the connector element 26 to move the connector element 26 to the disconnected position. In the present example the second actuator 138 is energised to apply the force to the connector element 26.

FIG. 3 shows the second power system 110 with the connector element 26 of the de-coupler in the connected position. In this example, the second actuator 138 is de-energised and does not apply a force to the connector element 26 when the connector element 26 is in the connected position. The second bias element 136 applies a force to the connector element 26 to maintain the connector element 26 in the connected position. With the connector element 26 in the connected position, the second power system 110 operates in the same manner as the power system 10.

FIG. 4 shows the second power system 110 with the connector element 26 of the de-coupler 16 in the disconnected position, in which the de-coupler 16 disconnects the motor-generator component 12 from the shaft 14. As in the power system 10, the de-coupler 16 may be controlled to disconnect the motor-generator component 12 from the shaft 14 in response to a fault with the motor-generator component 12.

In order to disconnect the motor-generator component 12 from the shaft 14, in the present example, the second actuator 138 is energised. This causes the second actuator 138 to apply a force on the connector element 26 to overcome the force form the second bias element 136 and move (slide) the connector element 26 to the disconnected position. With the connector element 26 in the disconnected position, the second power system 110 operates in the same manner as the power system 10.

Figure 5:
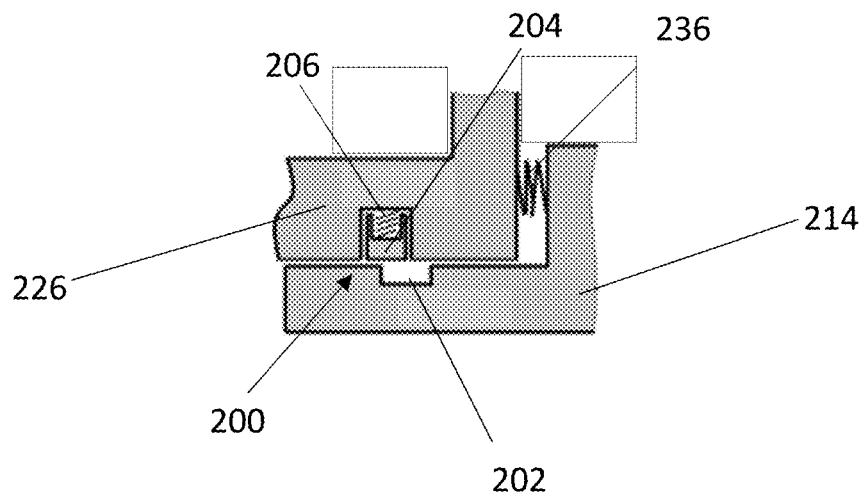
FIG. 5 shows a schematic cross-sectional drawing of a latch in an open position.
Figure 6:
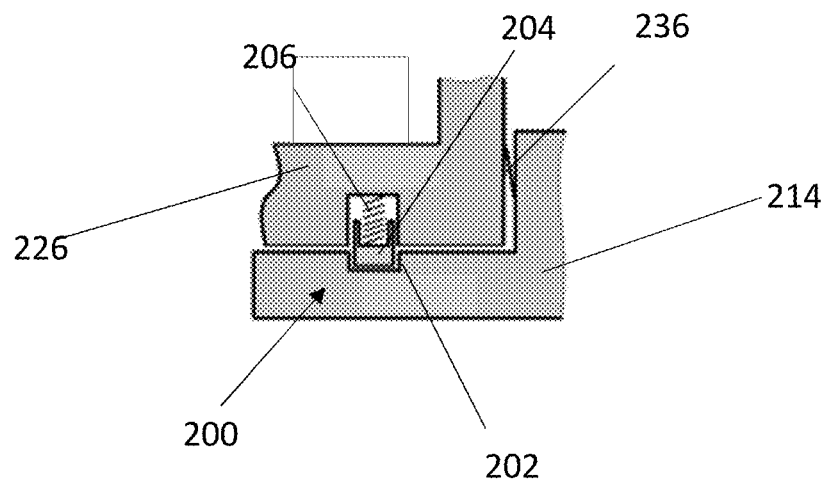
FIG. 6 shows a schematic cross-sectional drawing of the latch in a closed position.

FIG. 5 and FIG. 6 shows a latch 200 (omitted from FIGS. 1 and 2), which may be used in the power system 10 or the second power system. FIG. 5 and FIG. 6 also show a third shaft 214, a third connector element 226 and a third bias element 236, which operate in the same manner as the shaft 14, the connector element 26 and the second bias element 136 respectively.

When the latch 200 forms part of the power system 10, the third shaft 214 is the shaft 14, the third connector element 226 is the connector element 26 and the third bias element 236 is the bias element 36. When the latch 200 forms part of the second power system 110, the third shaft 214 is the shaft 14, the third connector element 226 is the connector element 26 and third bias element 236 is the second bias element 136.

The latch 200 comprises a groove 202 in the third shaft 214. The groove 202 is positioned on a radially inward facing surface of the third shaft 214. The groove 202 extends around the circumference of the third shaft 214.

The latch 200 comprises a plunger 204 and a latch bias element 206 on the connector element 226. The plunger 204 and latch bias element 206 are recessed in a cavity 208. The cavity 208 is positioned in a radially outward facing surface of the connector element 226. The latch bias element 206, which in the present example is a spring, applies a force to the plunger 204 to force the plunger out of the cavity 208 towards the groove 202.

FIG. 5 shows the third connector element 226 in the connected position, in which the third shaft 214 is connected to a motor-generator shaft as described above. When the third connector element 226 is in the connected position, the plunger 204 is not aligned in the groove 202 and the latch is open.

FIG. 6 shows the third connector element 226 in the disconnected position, in which the third shaft 214 is disconnected from the motor-generator shaft as described above. When the third connector element 226 is in the disconnected position, the plunger 204 is aligned with the groove 202. The latch bias element 206 forces the plunger 204 into the groove 202. The plunger 204 is received in the groove 202, thereby maintaining an axial position of the third connector element 226, and the latch is closed. In this example, the latch maintains the third connector element 226 in the disconnected position.

In some examples, the latch 200 is a centrifugal latch, which is configured to open to release the connector element 226 from the disconnected position when a rotational speed of the connector element 226 is below a threshold. This may be achieved by the latch bias element 206 in isolation not providing a sufficient force to move the plunger 204 into the groove 202. A centrifugal force, caused by rotation of the connector element 226, may assist to push the plunger 204 into the groove 202.

It will be understood that the latch 200 may be employed in the power system 10 or the second power system 110, and may be used to maintain a connector element in a connected position or a disconnected position.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments.

Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A power system for an aircraft, the power system comprising:
 a motor-generator component;
 a shaft that defines an axis of rotation, wherein the motor-generator component is connectable to the shaft, and wherein the shaft is connectable to an additional component of the aircraft for torque transfer with the additional component; and
 a de-coupler configured to disconnect the motor-generator component from the shaft, wherein the motor-generator component is located axially between the de-coupler and the additional component in use such that the de-coupler is positioned on an opposite side of the motor-generator component relative to the additional component.

2. The power system according to claim 1, wherein the shaft extends through the motor-generator component, including through a same side of the motor-generator component relative to the additional component, and through the opposite side of the motor-generator component.

3. The power system according to claim 1, wherein the motor-generator component comprises a second shaft configured to nest with the shaft.

4. The power system according to claim 3, wherein the second shaft surrounds the shaft.

5. The power system according to claim 1, wherein:
 the de-coupler comprises a connector element; and
 the connector element is movable into a disconnected position to disconnect the motor-generator component from the shaft.

6. The power system according to claim 5, wherein the connector element is slidable into the disconnected position.

7. The power system according to claim 5, further comprising an actuator configured to move the connector element into the disconnected position.

8. The power system according to claim 7, wherein the actuator is a solenoid.

9. The power system according to claim 5, wherein:
 the motor-generator component comprises a second shaft configured to nest with the shaft;
 the connector element comprises a torque coupler for connecting to the second shaft; and
 the torque coupler comprises connector element teeth configured to engage with second shaft teeth on the second shaft.

10. The power system according to claim 9, wherein the torque coupler is disconnected when the connector element is in the disconnected position.

11. The power system according to claim 10, wherein the connector element teeth are out of contact with first shaft teeth when the connector element is in the disconnected position.

12. The power system according to claim 5, further comprising a bias element configured to bias the connector element away from the disconnected position.

13. The power system according to claim 5, further comprising a latch configured to maintain the connector element in the disconnected position.

14. The power system according to claim 13, wherein the latch is a centrifugal latch configured to open to release the connector element from the disconnected position when a rotational speed is below a threshold.

15. An aircraft comprising:
 a power system comprising:
  a motor-generator component;
  a shaft that defines an axis of rotation, wherein the motor-generator component is connectable to the shaft, and wherein the shaft is connectable to an additional component of the aircraft for torque transfer with the additional component; and
  a de-coupler configured to disconnect the motor-generator component from the shaft, wherein the motor-generator component is located axially between the de-coupler and the additional component in use such that the de-coupler is positioned on an opposite side of the motor-generator component relative to the additional component.

16. The aircraft of claim 15, wherein:
 the de-coupler comprises a connector element; and
 the connector element is movable into a disconnected position to disconnect the motor-generator component from the shaft.

17. The aircraft of claim 16, wherein:
 the motor-generator component comprises a second shaft configured to nest with the shaft;
 the connector element comprises a torque coupler for connecting to the second shaft; and
 the torque coupler comprises connector element teeth configured to engage with second shaft teeth on the second shaft.

18. The aircraft of claim 17, wherein the torque coupler is disconnected when the connector element is in the disconnected position.

19. The aircraft of claim 16, wherein the power system further comprises a bias element configured to bias the connector element away from the disconnected position.

20. The aircraft of claim 19, wherein the power system further comprises a latch configured to maintain the connector element in the disconnected position.

* * * * *